(12) United States Patent
Segev

(10) Patent No.: US 12,631,440 B2
(45) Date of Patent: May 19, 2026

(54) CONTINUOUS BUMP MEASUREMENT HEIGHT METROLOGY

(71) Applicant: CAMTEK Ltd., Migdal-Haemek (IL)

(72) Inventor: Eyal Segev, Atlit (IL)

(73) Assignee: CAMTEK Ltd., Migdal-Haemek (IL)

( * ) Notice: Subject to any disclaimer, the term of this patent is extended or adjusted under 35 U.S.C. 154(b) by 601 days.

(21) Appl. No.: 18/005,351

(22) PCT Filed: Jul. 11, 2021

(86) PCT No.: PCT/IB2021/056218

§ 371 (c)(1),
(2) Date: Jan. 12, 2023

(87) PCT Pub. No.: WO2022/013703

PCT Pub. Date: Jan. 20, 2022

(65) Prior Publication Data

US 2023/0280282 A1 Sep. 7, 2023

Related U.S. Application Data

(60) Provisional application No. 62/705,730, filed on Jul. 13, 2020.

(51) Int. Cl.
*G01B 11/06* (2006.01)
*G01N 21/95* (2006.01)
*G01N 21/956* (2006.01)

(52) U.S. Cl.
CPC .......... *G01B 11/0633* (2013.01); *G01B 11/06* (2013.01); *G01B 11/0608* (2013.01);
(Continued)

(58) Field of Classification Search
CPC . G01B 11/0633; G01B 11/06; G01B 11/0608; G01B 11/0625; G01B 11/0675;
(Continued)

(56) References Cited

U.S. PATENT DOCUMENTS 8,849,015 B2 9/2014 Bodony et al.
2001/0000904 A1 5/2001 Hashimoto et al.
(Continued)

FOREIGN PATENT DOCUMENTS

WO 2019090315 A1 5/2019

OTHER PUBLICATIONS

First Office Action issued by the China Intellectual Property Administration for Chinese Patent Application No. 202180061011.9, dated Jun. 28, 2025, with machine-generated English translation attached.

*Primary Examiner* — Tarifur R Chowdhury
*Assistant Examiner* — Carlos Perez-Guzman
(74) *Attorney, Agent, or Firm* — Myers Wolin, LLC

(57) ABSTRACT

A method that may include performing first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump; preforming second measurements of thickness of the layer at the corresponding areas; wherein at least some of the first measurements are executed in parallel to an executing of at least some of the second measurements; determining first measurement errors, based on the second measurements; and determining the height differences between the bumps and the corresponding areas based on the first measurements and the first measurements errors.

21 Claims, 6 Drawing Sheets

(52) U.S. Cl.
CPC ...... *G01B 11/0625* (2013.01); *G01B 11/0675*
(2013.01); *G01N 21/9501* (2013.01); *G01N*
*21/956* (2013.01); *G01B 2210/50* (2013.01);
*G01B 2210/56* (2013.01)

(58) Field of Classification Search
CPC ............ G01B 2210/50; G01B 2210/56; G01N
21/9501; G01N 21/956
See application file for complete search history.

(56) References Cited

U.S. PATENT DOCUMENTS

| | | | |
|---|---|---|---|
| 2006/0109483 A1 | 5/2006 | Marx et al. | |
| 2014/0104406 A1 | 4/2014 | Pfeiffer et al. | |
| 2018/0135975 A1* | 5/2018 | Ohyama | ............... G06T 7/0004 |
| 2018/0209784 A1* | 7/2018 | Zhao | ................. G01B 11/2513 |
| 2020/0357704 A1 | 11/2020 | Schaefer | |

* cited by examiner

Figure 6:
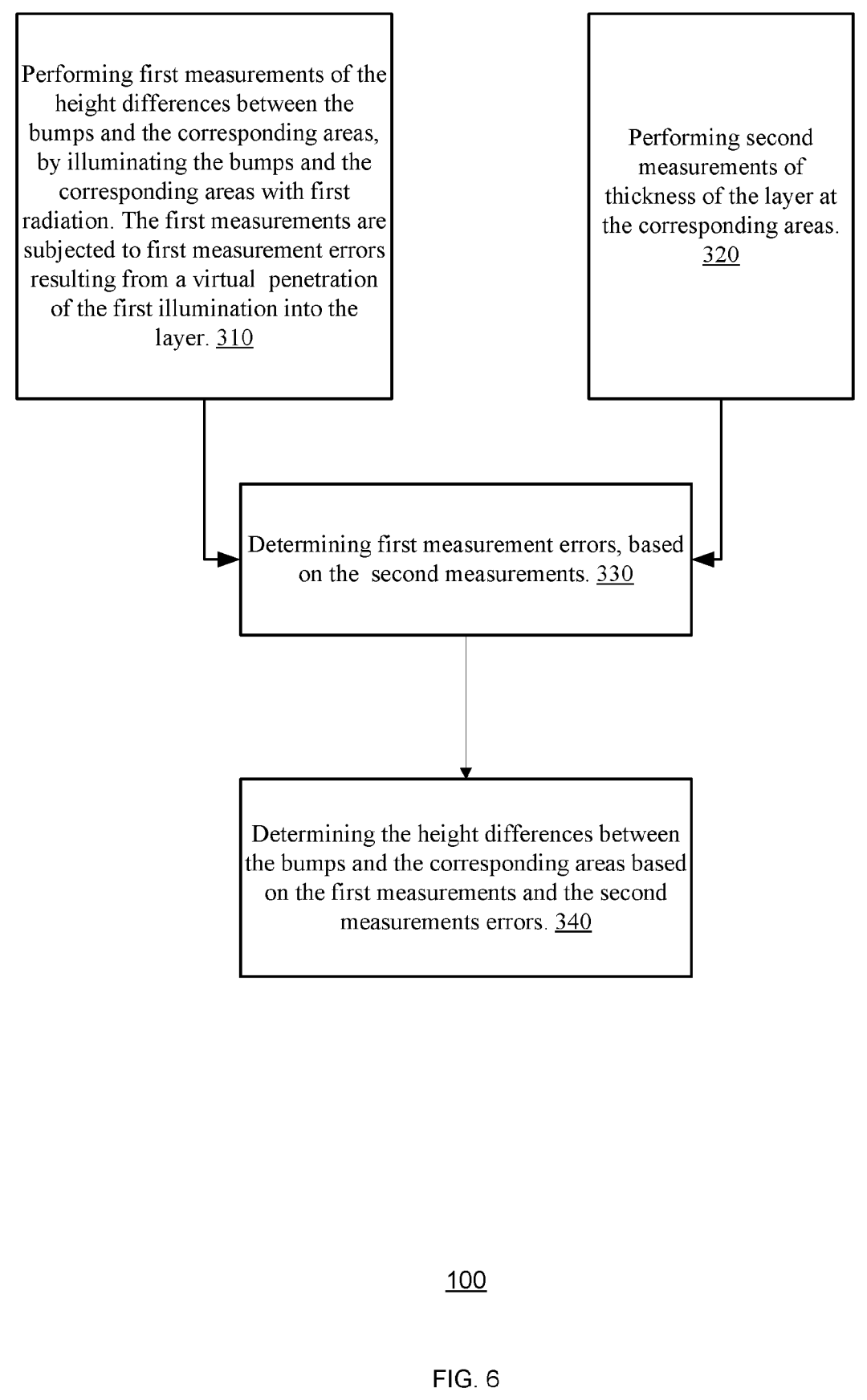

Performing first measurements of the height differences between the bumps and the corresponding areas, by illuminating the bumps and the corresponding areas with first radiation. The first measurements are subjected to first measurement errors resulting from a virtual penetration of the first illumination into the layer. 310

Performing second measurements of thickness of the layer at the corresponding areas. 320

Determining first measurement errors, based on the second measurements. 330

Determining the height differences between the bumps and the corresponding areas based on the first measurements and the second measurements errors. 340

CONTINUOUS BUMP MEASUREMENT HEIGHT METROLOGY

CROSS-REFERENCE

This application claims priority from U.S. provisional patent filing date Jun. 13, 2020, Ser. No. 62/705,731 and from U.S. provisional patent filing date Jun. 13, 2020, Ser. No. 62/705,730. Both provisional patents are incorporated herein by reference.

BACKGROUND

Bumps may be formed on a base layer or on an intermediate element that is formed on the base layer.

A top layer may be manufactured on the base layer. An upper part of the bump extends above the top layer. A lower part of the bump is surrounded by the top layer.

The top layer can be made of Photo-definable polyimides (PI) and/or polybenzoxazoles (PBO).

Top layers made of PI and/or PBO have been widely used as dielectrics for re-distribution layers in wafer level.

Top layers made of PI and/or PBO are partially transparent to first radiation such as visible light radiation.

Visual light based triangulation may scan the bumps and the top layer to provide height measurements.

It may be desired to measure the height difference between (a) the top of the bump, and (b) an upper surface of the top layer.

Due to the partial transparency of the top layer—the visual light based triangulation does not measure the height of the upper surface of the top layer—but rather measures the height of a virtual plane within the top layer. The virtual plane represents a virtual reflection plane within the top layer. The light changes its propagation angle when entering the top layer—due to a difference between the refraction index of the air and the refraction index of the top layer. While the light is reflected by the top surface of the base layer—the virtual plane represent a virtual reflection plane at the absence of a change in the propagation angle within the top layer.

The distance between the upper surface of the top layer and the virtual plane is referred to a virtual penetration depth (PenetrateDepth) and is unknown—the visual light based triangulation does not provide a reliable measurement of the bump properties.

There is a growing need to provide a reliable system and method for estimating the height difference between the top of bumps and the upper surface of the top layer.

SUMMARY

There are provided a system, non-transitory computer readable medium and a method for estimating the height difference between the top of bumps and the upper surface of the top layer.

There may be provided a method for measuring height differences between tops of multiple bumps and corresponding areas of an upper surface of a layer, the method may include performing first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that may be proximate to the bump; preforming second measurements of thickness of the layer at the corresponding areas; wherein at least some of the first measurements are executed in parallel to an executing of at least some of the second measurements; determining first measurement errors, based on the second measurements; and determining the height differences between the bumps and the corresponding areas based on the first measurements and the first measurements errors.

The first measurement errors may represent virtual penetration depths of the first radiation within the corresponding areas.

The determining of the first measurement errors may be based on the second measurements and on a refraction index of the layer.

The first radiation may be white light.

The layer may include at least one of Photo-definable polyimides and polybenzoxazoles.

The bumps may include a vast majority of bumps of a wafer.

The method may include executing the first measurements before or after an executing of the second measurements.

The performing of the first measurements may include performing white light triangulation.

The performing of the second measurements may include performing reflectometry.

The performing of the second measurements may include performing chromatic confocal measurements.

There may be provided a measurement system for measuring height differences between tops of multiple bumps and corresponding areas of an upper surface of a layer, the system may include one or more measurement units and at least one processing unit that are configured to perform first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that may be proximate to the bump; preform second measurements of thickness of the layer at the corresponding areas; wherein at least some of the first measurements are executed in parallel to an executing of at least some of the second measurements; determine first measurement errors, based on the second measurements; and determine the height differences between the bumps and the corresponding areas based on the first measurements and the first measurements errors.

The first measurement errors represents virtual penetration depths of the first radiation within the corresponding areas.

The determining of the first measurement errors may be based on the second measurements and on a refraction index of the layer.

The first radiation may be white light.

The layer may include at least one of Photo-definable polyimides and polybenzoxazoles.

The bumps may include a vast majority of bumps of a wafer.

The performing of the first measurements may include performing white light triangulation.

A second measurement unit may be a reflectometer.

A second measurement unit may include a chromatic confocal measurement unit.

There may be provided non-transitory computer readable for measuring height differences between tops of multiple bumps and corresponding areas of an upper surface of a layer, the non-transitory computer readable may store instructions for performing first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that may be proximate to the bump; preforming second measurements of thickness of the layer at the corresponding areas; wherein at least some of the first measurements are executed in parallel to an executing of at least some of the second measurements; determining first measurement errors, based on the second measurements; and determining the height differences between the bumps and the corresponding areas based on the first measurements and the first measurements errors.

The first measurement errors may represent virtual penetration depths of the first radiation within the corresponding areas.

The determining of the first measurement errors may be based on the second measurements and on a refraction index of the layer.

The first radiation may be white light.

The layer may include at least one of Photo-definable polyimides and polybenzoxazoles.

The bumps may include a vast majority of bumps of a wafer.

The non-transitory computer readable may store instructions for executing the first measurements before or after an executing of the second measurements.

The performing of the first measurements may include performing white light triangulation.

The performing of the second measurements may include performing reflectometry.

The performing of the second measurements may include performing chromatic confocal measurements.

BRIEF DESCRIPTION OF THE DRAWINGS

The present invention will be understood and appreciated more fully from the following detailed description taken in conjunction with the drawings in which:

FIG. 6 illustrates a method for measuring height differences

DETAILED DESCRIPTION OF THE INVENTION

Figure 1:
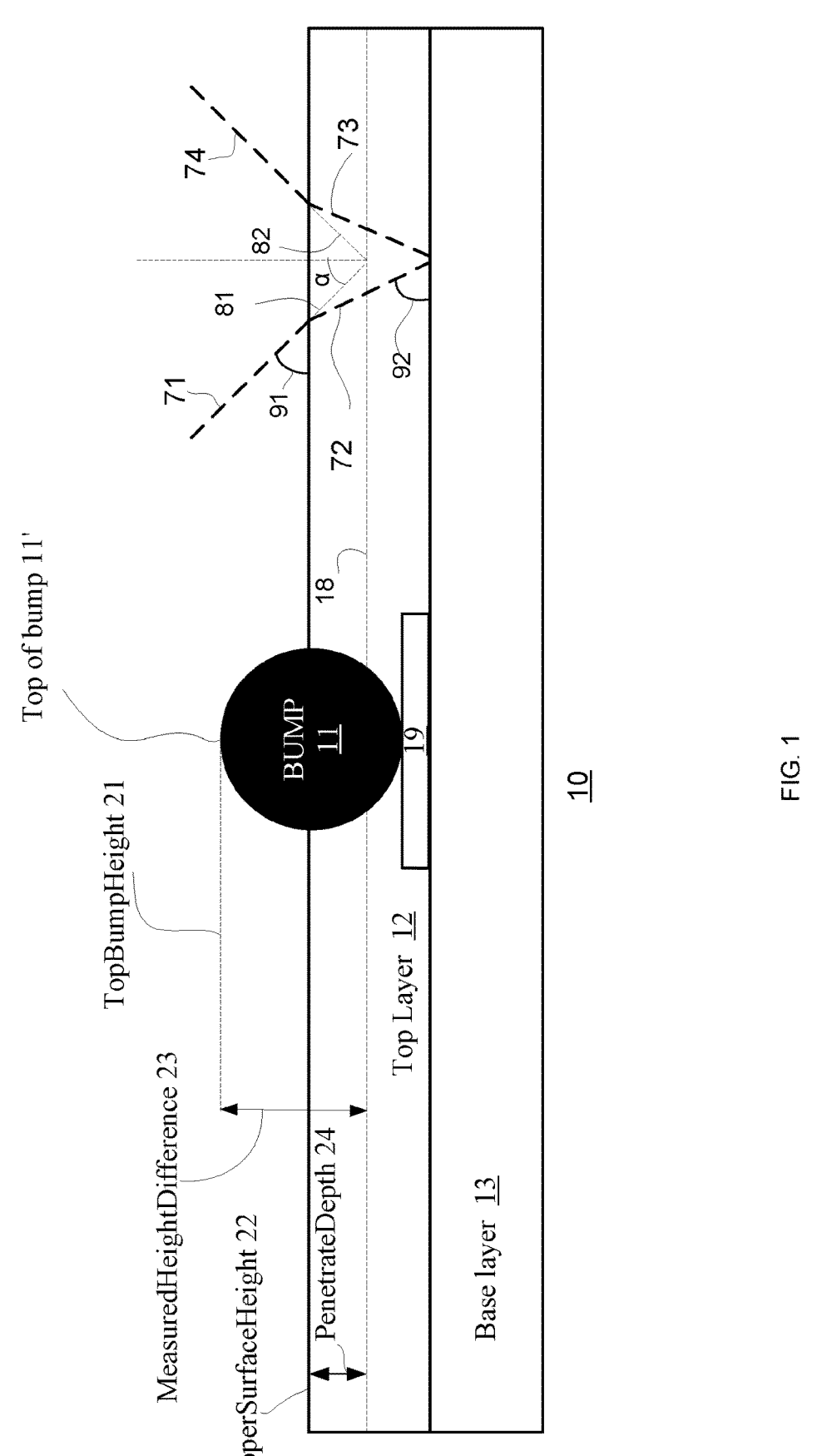
FIG. 1 illustrates a first phase of a process.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer program product that stores instructions that once executed by a computer result in the execution of the method. The non-transitory computer program product may be a chip, a memory unit, a disk, a compact disk, a non-volatile memory, a volatile memory, a magnetic memory, a memristor, an optical storage unit, and the like.

Any reference in the specification to a system should be applied mutatis mutandis to a method that can be executed by the system and should be applied mutatis mutandis to a non-transitory computer program product that stores instructions that once executed by a computer result in the execution of the method.

Any reference in the specification to a non-transitory computer program product should be applied mutatis mutandis to a method that can be executed when applying the instructions stored in the non-transitory computer program product and should be applied mutatis mutandis to a system capable of executing the instructions stored in the non-transitory computer program product.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

In the following specification, the invention will be described with reference to specific examples of embodiments of the invention. It will, however, be evident that various modifications and changes may be made therein without departing from the broader spirit and scope of the invention as set forth in the appended claims.

There is provided a system and method for calculating a height difference between a top of a bump and an upper surface of a top layer that is at least partially transparent to radiation such as white light. The top layer may be made of PI and/BPO.

Referring to FIG. 1—it may be desired to measure the height difference between (a) the top (11') of the bump 11, and (b) an upper surface 12' of the top layer 12. The height of a top of a bump is denoted TopBumpHeight 21. The height of the upper surface of the top layer is denoted UpperSurfaceHeight 22.

An illuminating visual light beam 71 propagates at a first angle 91 until reaching the top layer and then changes its propagation angle to a second propagation angle 92 and progresses (see 72) within the top layer until impinging on the top of the base layer 13 to provide a reflected light beam 73 that propagates within the top layer till reaching air, changing its propagation angle, and continuing to propagate in air to provide detected light beam 74. FIG. 1 also illustrates angle $\alpha$, whereas the first angle equals $(90°-\alpha)$.

Assuming that the refraction index of the top layer is denoted n, and the thickness of the top layer is denoted b then the virtual penetration depth equals b multiplied by a square root of $(1-\sin^2\alpha)/(n^2-\sin^2\alpha)$.

The virtual plane 18 is a virtual reflection plane that virtually continues the progress of the illumination light beam 71 within the top layer had the first angle 91 maintained in the top layer (see virtual line of propagation 81)—and virtually coincides (see arrow 82) with the detected light beam 74.

The height of a top of a bump is denoted TopBumpHeight 21. The height of the upper surface of the top layer is denoted UpperSurfaceHeight 22.

The location of the internal portion corresponds to the virtual penetration depth. The virtual penetration depth of the visible light in the top layer is denoted PenetrateDepth 24.

Thus—the measured height may equal UpperSurface-Height–PenetrateDepth.

Accordingly—the height difference measured by the visual light based triangulation equals: MeasuredHeightDifference 23=(TopBumpHeight+PenetrateDepth)–UpperSurfaceHeight.

FIG. 1 illustrates a first phase during which visual light based triangulation is applied to provide MeasuredHeightDifference 23 which is an example of a first measurement of the height difference.

UpperSurfaceHeight is the height of the top surface 12' of top layer 12. The top layer 12 is positioned above base layer 13. FIG. 1 also illustrates an intermediate element 19 formed on the base layer 13. The bump 11 is formed on the intermediate element 19.

TopBumpHeight 21 is the measured height of the top (11') of bump 11.

PenetrateDepth 24 is the virtual penetration depth of the first radiation within top layer 12. This virtual penetration introduced a first measurement error—as the first measurement actually measures a height of the virtual penetration—which equals (UpperSurfaceHeight–PenetrateDepth).

(UpperSurfaceHeight–PenetrateDepth) is measured in proximity of the bump—at a points that can be regarded as an area the corresponds to the bump.

The first measurement of the height difference (for example MeasuredHeightDifference 23) equals Top-BumpHeight minus (UpperSurfaceHeight–PenetrateDepth).

MeasuredHeightDifference=(TopBumpHeight+Penetrat-eDepth)–UpperSurfaceHeight.

MeasuredHeightDifference is done by measuring (Upper-SurfaceHeight–PenetrateDepth) near each bump to be measured.

This phase is applied on a group of bumps—for example all bumps in the wafer.

Figure 2:
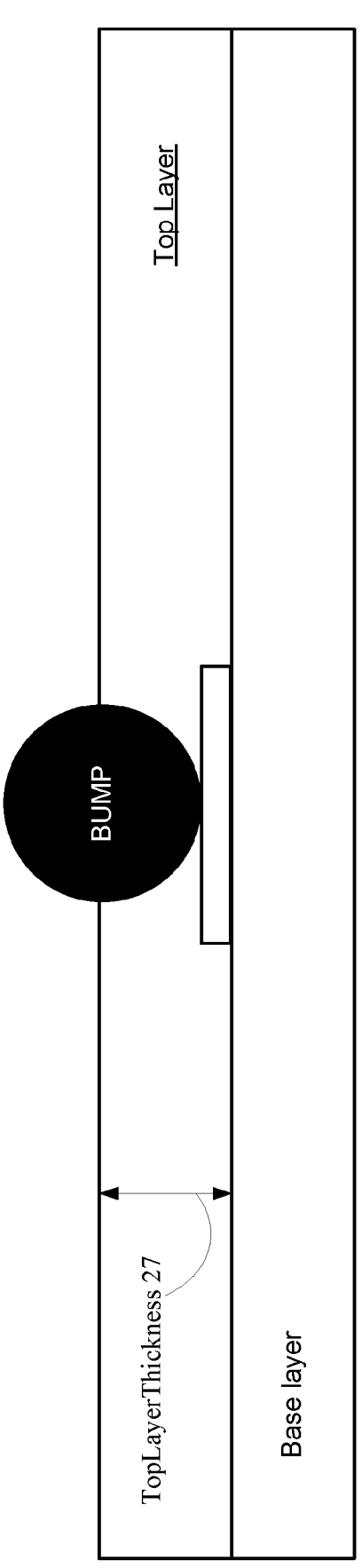
FIG. 2 illustrates a second phase of a process.

FIG. 2 illustrates a second phase during which the thickness of the top layer (TopLayerThickness 27) is measured using a thickness sensor. Examples of such a sensor include a reflectometry sensor and a chromatic confocal sensor.

The thickness may be measured near each bump of the group of bumps—or may be measured near some bumps and estimated in any manner near other bumps.

The first and second phases may be executed concurrently, in a partial overlapping manner or in fully overlapping manner.

The thickness sensor may differ from the sensor used during the visual light based triangulation.

The first and second phases are followed by a third phase of estimating the virtual penetration depth to provide EstimatedPenetrateDepth 24'.

$$EstimatedPenetrationDepth = b * \sqrt{\frac{(1-\sin^2\alpha)}{(n^2-\sin^2\alpha)}}$$

Figure 3:
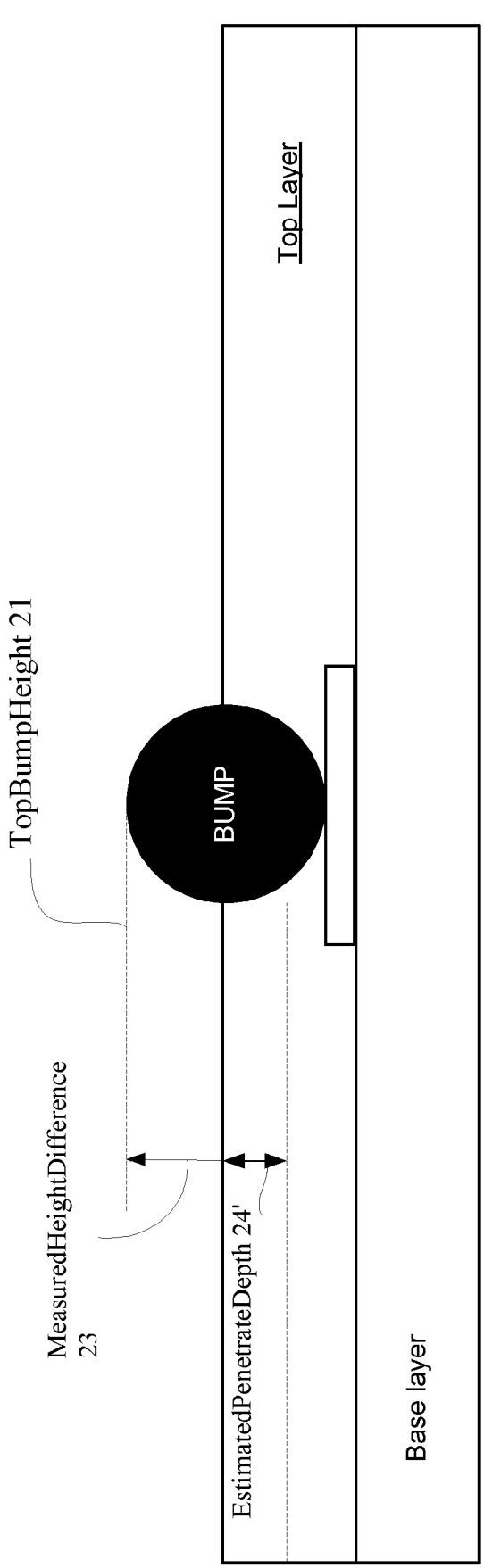
FIG. 3 illustrates a third phase of a process.
Figure 4:
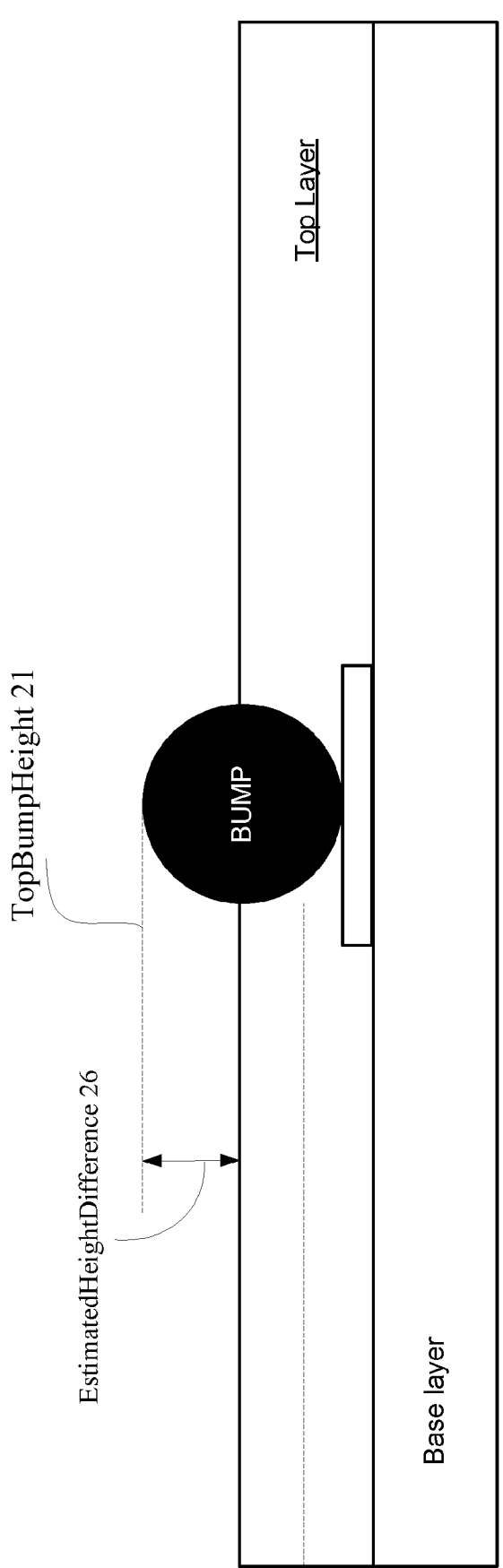
FIG. 4 illustrates a wafer and first till fifth radial sent of selected bumps.

The third phase is followed by a fourth phase (see FIG. 3) of amending the MeasuredHeightDifference by subtracting the EstimatedPenetrateDepth 24' from the MeasuredHeight-Difference 23 to provide EstimatedHeightDifference 26 (see FIG. 4)—the estimated difference between the top of a bump and an upper surface of a top layer.

Figure 5:
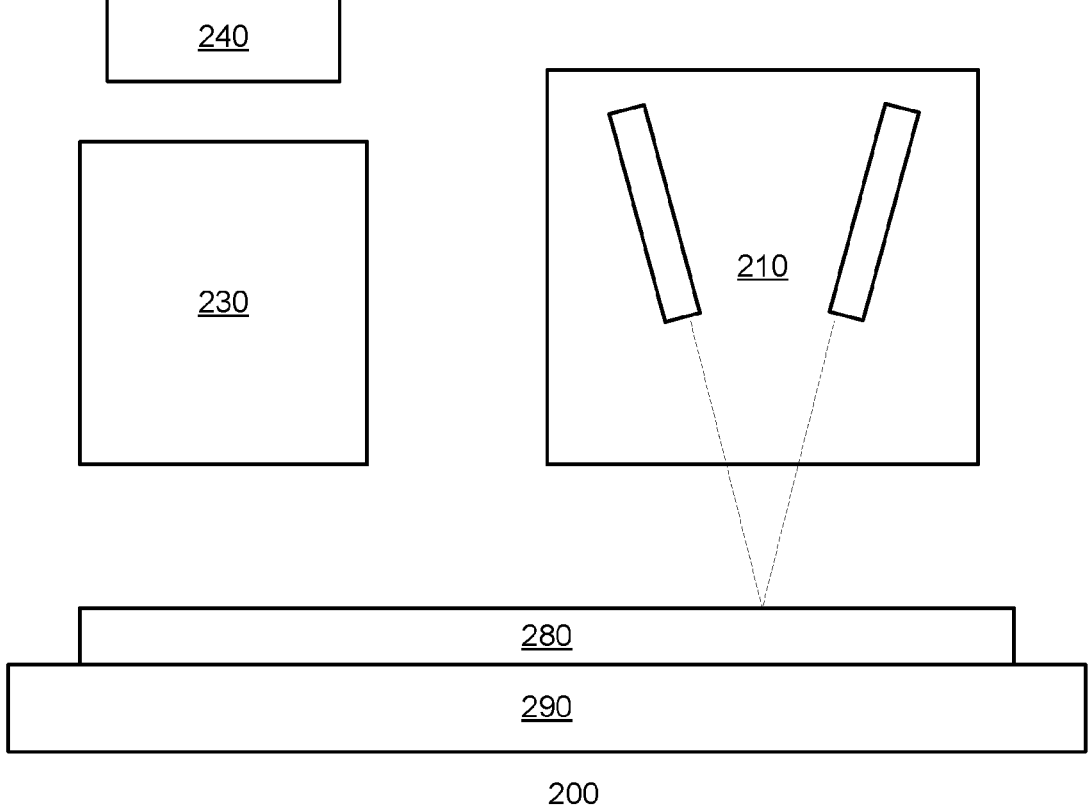
FIG. 5 illustrates a measurement system.

FIG. 5 is an example of a measurement system 200.

Measurement system 200 is configured to measure height differences between tops of multiple bumps and corresponding areas of an upper surface of a layer.

The measurement system 200 may include one or more measurement units and at least one processing unit that are configured to:

a. Perform first measurements of the height differences between the bumps and the corresponding areas, by illuminating the bumps and the corresponding areas with first radiation; wherein the first measurements are subjected to first measurement errors resulting from a virtual penetration of the first illumination into the layer; wherein each bump has a corresponding area that is proximate to the bump.

b. Preform second measurements of thickness of the layer at the corresponding areas.

c. Determine first measurement errors, based on the second measurements.

d. Determine the height differences between the bumps and the corresponding areas based on the first measurements and the first measurements errors The one or more measurement units may include a first measurement unit for executing the first measurements and a second measurement unit for executing the second measurements.

In FIG. 5 the first measurement unit is a triangulation unit 210 that may be a white light triangulation sensor. See, for example, U.S. Pat. No. 8,363,229.

In FIG. 5 the second measurement unit is a thickness sensor 230. Examples of such a sensor include a reflecto-metry sensor and a chromatic confocal sensor In FIG. 5 the wafer 280 is supported by a chuck 290 and there is illustrated a processing unit 240.

The determining of the first measurement errors and/or the determining of the height differences may be executed by the at least one processing unit. The at least one processing unit may belong to the one or more measurement units or may not belong to the one or more measurement units.

The processing unit may be a server, a desktop computer, a hardware accelerator, and the like.

The measurement system may include other parts and/or components such as a mechanical stage, and the like.

FIG. 6 illustrates an example of a method 300 for measuring height differences between tops of multiple bumps and corresponding areas of an upper surface of a layer.

Each bump has a corresponding area—which is the area that is proximate to the bump. Proximate may be within a millimetric distance (for example less than a centimeter or a fraction of centimeter). The corresponding area may be closer to the bump in relation to another bump. The corresponding area may contact the bump and/or surround the bump. The corresponding area may be of any shape or size—for example may be of millimetric scale. The corresponding area may be of a size that may equal (or may be slightly bigger than) a size of a spot of radiation (first radiation and/or second radiation). Alternatively—the corresponding area may be much bigger than the size of a spot of radiation.

Method 300 may include steps 310 and 320.

Each one of steps 310 and 320 may be executed on all the bumps of the wafer, or on a vast majority (for example at least 60, 70, 80 percent) of such bumps.

Virtually all bumps that are being measured in step 310 and also measured in step 320.

Step 310 may include performing first measurements of the height differences between the bumps and the corresponding areas, by illuminating the bumps and the corresponding areas with first radiation. The first measurements are subjected to first measurement errors resulting from a virtual penetration of the first illumination into the layer.

Step 320 may include preforming second measurements of thickness of the layer at the corresponding areas.

Step 310 may be executed in at least in part in parallel to step 320. Thus—at least some first measurements may taken in parallel to at least some second measurements. Such a timing overlap may be obtained when one measurement does not interfere with another measurement.

The first radiation may be white light.

The layer may include at least one of Photo-definable polyimides and polybenzoxazoles.

Step 310 may include performing white light triangulation. See, for example, U.S. Pat. No. 8,363,229.

Step 320 may include performing measurements using a thickness sensor. Examples of such a sensor include a reflectometry sensor and a chromatic confocal sensor.

Steps 310 and 320 may be followed by step 330 of determining first measurement errors, based on the second measurements.

For example—step 330 may include calculating the following equation $$EstimatedPenetrationDepth = b * \sqrt{\frac{(1 - \sin^2\alpha)}{(n^2 - \sin^2\alpha)}}$$

Step 330 may be followed by step 340 of determining the height differences between the bumps and the corresponding areas based on the first measurements and the second measurements errors.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for measuring height differences between tops of multiple bumps and corresponding areas of an upper surface of a layer, the method comprises:

performing first measurements of the height differences between the bumps and the corresponding areas, by illuminating the bumps and the corresponding areas with first radiation at angle $\alpha$ relative to a normal to the layer;

wherein the first measurements are subjected to first measurement errors resulting from a virtual penetration of the first illumination into the layer; wherein each bump has a corresponding area that is proximate to the bump;

performing second measurements of thickness of the layer at the corresponding areas; wherein at least some of the first measurements are executed in parallel to an executing of at least some of the second measurements;

determining first measurement errors, based on b, being a thickness of the layer as measured by the second measurements, $\alpha$ and n, being a refraction index of the layer; and determining the height differences between the bumps and the corresponding areas based on the first measurements and the first measurements errors.

2. The method according to claim 1, wherein the first measurement errors represents virtual penetration depths of the first radiation within the corresponding areas.

3. The method according to claim 1, wherein the determining of the first measurement errors is based on the second measurements and on a refraction index of the layer.

4. The method according to claim 1, wherein the first radiation is white light.

5. The method according to claim 1, wherein the layer comprises at least one of Photo-definable polyimides and polybenzoxazoles.

6. The method according to claim 1, wherein the bumps comprise a vast majority of bumps of a wafer.

7. The method according to claim 1, wherein the performing of the first measurements comprises performing white light triangulation.

8. The method according to claim 1, wherein the performing of the second measurements comprises performing reflectometry.

9. The method according to claim 1, wherein the performing of the second measurements comprises performing chromatic confocal measurements.

10. A measurement system for measuring height differences between tops of multiple bumps and corresponding areas of an upper surface of a layer, the system comprises:

one or more measurement units and at least one processing unit that are configured to:

perform first measurements of the height differences between the bumps and the corresponding areas, by illuminating the bumps and the corresponding areas with first radiation at angle α relative to a normal to the layer;

wherein the first measurements are subjected to first measurement errors resulting from a virtual penetration of the first illumination into the layer; wherein each bump has a corresponding area that is proximate to the bump;

perform second measurements of thickness of the layer at the corresponding areas; wherein at least some of the first measurements are executed in parallel to an executing of at least some of the second measurements;

determine first measurement errors, based on b, being a thickness of the layer as measured by the second measurements, α and n, being a refraction index of the layer; and determine the height differences between the bumps and the corresponding areas based on the first measurements and the first measurements errors.

11. The measurement system according to claim 10, wherein the first measurement errors represents virtual penetration depths of the first radiation within the corresponding areas.

12. The measurement system according to claim 10, wherein a determining of the first measurement errors is based on the second measurements and on a refraction index of the layer.

13. The measurement system according to claim 10, wherein the first radiation is white light.

14. The measurement system according to claim 10, wherein the layer comprises at least one of Photo-definable polyimides and polybenzoxazoles.

15. The measurement system according to claim 10, wherein the bumps comprise a vast majority of bumps of a wafer.

16. The measurement system according to claim 10, wherein a first measurement unit is a white light triangulation unit.

17. The measurement system according to claim 10, wherein a second measurement unit is a reflectometer.

18. The measurement system according to claim 10, wherein a second measurement unit is a chromatic confocal measurement unit.

19. A non-transitory computer readable medium for measuring height differences between tops of multiple bumps and corresponding areas of an upper surface of a layer, the non-transitory computer readable medium stores instructions for:

performing first measurements of the height differences between the bumps and the corresponding areas, by illuminating the bumps and the corresponding areas with first radiation at angle α relative to a normal to the layer, wherein the first measurements are subjected to first measurement errors resulting from a virtual penetration of the first illumination into the layer, wherein each bump has a corresponding area that is proximate to the bump;

performing second measurements of thickness of the layer at the corresponding areas, and wherein at least some of the first measurements are executed in parallel to an executing of at least some of the second measurements;

determining first measurement errors, based on b, being a thickness of the layer as measured by the second measurements, a and n, being a refraction index of the layer; and determining the height differences between the bumps and the corresponding areas based on the first measurements and the first measurements errors.

20. The method according to claim 1, wherein the first measurement errors are calculated based on a formula being:

$$b * \sqrt{\frac{1 - \sin^2\alpha}{n^2 - \sin^2\alpha}}.$$

21. The measurement system according to claim 10, wherein the first measurement errors are calculated based on a formula being:

$$b * \sqrt{\frac{1 - \sin^2\alpha}{n^2 - \sin^2\alpha}}.$$

* * * * *